US011044661B2

(12) United States Patent
Liu (10) Patent No.: US 11,044,661 B2
(45) Date of Patent: Jun. 22, 2021

(54) METHOD AND APPARATUS FOR ACQUIRING INFORMATION (71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/604,992

(22) PCT Filed: Apr. 18, 2017

(86) PCT No.: PCT/CN2017/080851
§ 371 (c)(1),
(2) Date: Oct. 11, 2019

(87) PCT Pub. No.: WO2018/191855
PCT Pub. Date: Oct. 25, 2018

(65) Prior Publication Data
US 2020/0163002 A1 May 21, 2020

(51) Int. Cl.
H04W 48/14 (2009.01)
H04W 4/70 (2018.01)
H04W 48/10 (2009.01)

(52) U.S. Cl.
CPC ............. H04W 48/14 (2013.01); H04W 4/70 (2018.02); H04W 48/10 (2013.01)

(58) Field of Classification Search
CPC ....... H04W 48/14; H04W 4/70; H04W 48/10; H04W 48/12; H04W 36/26; H04W 74/008

(Continued)

(56) References Cited

U.S. PATENT DOCUMENTS

2016/0353473 A1 12/2016 Chen et al.
2017/0311285 A1* 10/2017 Ly ..................... H04W 74/0833
(Continued)

FOREIGN PATENT DOCUMENTS

CN 101227706 A 7/2008
CN 103179513 A 6/2013
(Continued)

OTHER PUBLICATIONS

ISA State Intellectual Property Office of the People's Republic of China, International Search Report Issued in Application No. PCT/CN2017/080851, dated Jan. 16, 2018, WIPO, 4 pages.
(Continued)

Primary Examiner — Kwang B Yao
Assistant Examiner — Syed M Bokhari
(74) Attorney, Agent, or Firm — Syncoda LLC; Feng Ma (57) ABSTRACT A method for acquiring includes: after receiving key system information broadcast by a base station, detecting whether a triggering condition for acquiring additional system information is met; when determining that the triggering condition is met, sending an acquisition request for the additional system information to the base station; and receiving the additional system information directionally sent by the base station according to the acquisition request; where the key system information is minimum system information required for the terminal to randomly access the base station, and the additional system information is system information other than the key system information. A machine type communication (MTC) terminal acquires the additional system information only when the triggering condition for acquiring the additional system information is met, which is more suitable for beam sweeping scenarios in 5G, and improves efficiency.

11 Claims, 5 Drawing Sheets (58) Field of Classification Search
USPC .......................................................... 370/328
See application file for complete search history.

(56) References Cited

U.S. PATENT DOCUMENTS

| | | | | |
|---|---|---|---|---|
| 2017/0311290 | A1* | 10/2017 | Adjakple | .............. H04W 76/18 |
| 2018/0124823 | A1* | 5/2018 | Liu | ................... H04W 74/0833 |
| 2018/0288683 | A1* | 10/2018 | Bendlin | .............. H04W 74/006 |
| 2018/0302843 | A1* | 10/2018 | Frenger | ................. H04W 48/10 |

FOREIGN PATENT DOCUMENTS

| | | |
|---|---|---|
| CN | 103534970 A | 1/2014 |
| CN | 104811264 A | 7/2015 |
| CN | 106171011 A | 11/2016 |
| CN | 108541391 A | 9/2018 |

OTHER PUBLICATIONS

ISA State Intellectual Property Office of the People's Republic of China, Written Opinion of the International Searching Authority Issued in Application No. PCT/CN2017/080851, dated Jan. 16, 2018, WIPO, 4 pages.

State Intellectual Property Office of the People's Republic of China, Office Action and Search Report Issued in Application No. 201780000237.1, dated Jan. 6, 2020, 17 pages. (Submitted with Machine Translation).

Samsung, "Report-of-email-disscussion-on-[94#40][NR]System-information" 3GPP TSG-RAN WG2, R2-165201, Gothenburg, Sweden, Aug. 22-26, 2016, 46 pages.

Huawei, "Support of Network Slice Discovery", 3GPP TSG-RAN WG3 #93bis, R3-162462, Sophia Antipolis, France, Oct. 10-14, 2016, 5 pages.

* cited by examiner

METHOD AND APPARATUS FOR ACQUIRING INFORMATION

TECHNICAL FIELD

The present disclosure relates to the field of communications, and in particular, to methods and apparatuses for acquiring information.

BACKGROUND

Standardization with a 5G, e.g., new radio (NR) network is being carried out in the 3rd Generation Partnership Project (3GPP). In a 5G system, key system information needs to be transmitted through high frequency beams with a specific frequency band according to a preset scheduling period, to all types of terminals within the coverage of a base station in a sweeping manner. Additional system information is to be transmitted similarly, using the same high-frequency beam in a sweeping manner to all types of terminals continuously. The key system information is minimum system information required for a terminal to randomly access the base station, and the additional system information is system information other than the key system information.

However, since MTC (Machine type communication) terminals are characterized by low mobility and time tolerability, for the additional system information transmitted in the above manner, the MTC terminals constantly monitor additional system information sent by a base station in a beam sweeping manner like mobile terminals, therefore resulting in a waste of resources.

SUMMARY

In order to overcome the problems in the related art, examples of the present disclosure provide a method and an apparatus for acquiring information.

According to a first aspect of examples of the present disclosure, a method of acquiring information is provided, the method being applied to an MTC terminal, and including:

after receiving key system information broadcast by a base station, detecting whether a triggering condition for acquiring additional system information is met;

when determining that the triggering condition is met, sending an acquisition request for the additional system information to the base station; and receiving the additional system information directionally sent by the base station based on the acquisition request;

where the key system information is minimum system information required for the terminal to randomly access the base station, and the additional system information is system information other than the key system information.

Optionally, the triggering condition includes any one of the following:

a service demand is detected; and a demand for a cell handover is detected.

Optionally, the key system information carries a target period duration set by the base station for broadcasting the additional system information to the MTC terminal, where the target period duration exceeds a period duration in which the base station broadcasts SIB1 of the system information blocks (SIBs).

Optionally, the triggering condition includes any one of the following:

an accumulated duration between a current time point and a time point at which the key system information is received reaches the target period duration;

when the accumulated duration is less than the target period duration, the service demand is detected; and when the accumulated duration is less than the target period duration, the demand for the cell handover is detected.

According to a second aspect of examples of the present disclosure, a method of acquiring information is provided, the method being applied to a base station, and including:

after broadcasting key system information, receiving an acquisition request for additional system information sent by an MTC terminal when determining that a triggering condition for acquiring the additional system information is met; and according to the acquisition request, sending the additional system information directionally to the MTC terminal;

where the key system information is minimum system information required for the terminal to randomly access the base station, and the additional system information is system information other than the key system information.

Optionally, the method further including:

setting a target period duration for broadcasting the additional system information to the MTC terminal, where the target period duration exceeds a period duration in which the base station broadcasts SIB1 of the SIBs;

broadcasting key system information, including broadcasting the key system information carrying the target period duration.

According to a third aspect of examples of the present disclosure, an apparatus for acquiring information is provided, the apparatus being applied to an MTC terminal, and including:

a detecting module, configured to detect, after receiving key system information broadcast by the base station, whether a triggering condition for acquiring additional system information is met;

a first sending module, configured to send, after determining that the triggering condition is met, an acquisition request for the additional system information to the base station; and a first receiving module, configured to receive the additional system information directionally sent by the base station based on the acquisition request;

where the key system information is minimum system information required for the terminal to randomly access the base station, and the additional system information is system information other than the key system information.

Optionally, the triggering condition includes any one of the following:

a service demand is detected;

a demand for a cell handover is detected.

Optionally, the key system information carries a target period duration set by the base station for broadcasting the additional system information to the MTC terminal, where the target period duration exceeds a period duration in which the base station broadcasts SIB1 of the SIBs.

Optionally, the triggering condition includes any one of the following:

an accumulated duration between a current time point and a time point at which the key system information is received reaches the target period duration;

when the accumulated duration is less than the target period duration, the service demand is detected; and when the accumulated duration is less than the target period duration, the demand for the cell handover is detected.

According to a fourth aspect of examples of the present disclosure, an apparatus for acquiring information is provided, the apparatus being applied to a base station, and including:

a second receiving module, configured to receive, after broadcasting key system information, an acquisition request for additional system information sent by an MTC terminal when determining that a triggering condition for acquiring the additional system information is met; and a second sending module, configured to send the additional system information directionally to the MTC terminal according to the acquisition request;

where the key system information is minimum system information required for the terminal to randomly access the base station, and the additional system information is system information other than the key system information.

Optionally, the apparatus further includes:

a period duration configuration module, configured to a target period duration for broadcasting the additional system information to the MTC terminal, where the target period duration exceeds a period duration in which the base station broadcasts SIB1 of the SIBs;

the second receiving module includes a broadcasting sub-module, configured to broadcast the key system information carrying the target period duration.

According to a fifth aspect of examples of the present disclosure, a computer readable storage medium is provided, where the storage medium stores a computer program, the computer program is for performing the information acquisition method of the first aspect.

According to a sixth aspect of examples of the present disclosure, a computer readable storage medium is provided, where the storage medium stores a computer program for performing the information acquisition method of the second aspect.

According to a seventh aspect of examples of the present disclosure, an MTC terminal is provided, including:

a processor; and
a memory for storing processor executable instructions;
where the processor is configured to:

after receiving key system information broadcast by a base station, detect whether a triggering condition for acquiring additional system information is met;

when determining that the triggering condition is met, send an acquisition request for the additional system information to the base station; and receive the additional system information directionally sent by the base station based on the acquisition request;

where the key system information is minimum system information required for the terminal to randomly access the base station, and the additional system information is system information other than the key system information.

According to an eighth aspect of examples of the present disclosure, a base station is provided, including:

a processor; and
a memory for storing processor executable instructions;
where the processor is configured to:

after broadcasting key system information, receive an acquisition request for additional system information sent by an MTC terminal when determining that a triggering condition for acquiring the additional system information is met; and according to the acquisition request, send the additional system information directionally to the MTC terminal;

where the key system information is minimum system information required for the terminal to randomly access the base station, and the additional system information is system information other than the key system information.

The technical solutions provided by the examples of the present disclosure may include the following beneficial effects.

In an example of the present disclosure, an MTC terminal automatically detects whether a triggering condition for acquiring additional system information is met after receiving key system information sent by a base station. When determining that the trigger condition is met, the MTC terminal sends an acquisition request to the base station for acquiring the additional system information, so as to receive the additional system information sent by the base station according to the acquisition request. Through the process, after receiving the key system information, the MTC terminal requests to acquire the additional system information only when the triggering condition for acquiring the additional system information is met. This is more suitable for beam sweeping scenarios in 5G, and improves efficiency of a 5G communication system.

In an example of the present disclosure, the MTC terminal may determine that the triggering condition for acquiring the additional system information is met, when detecting that a service demand exists in itself, or when detecting a demand for a cell handover, that is, when the MTC terminal demands the cell handover. At this time, the MTC terminal may send the acquisition request to the base station, so as to acquire the additional system information returned by the base station based on the acquisition request. Through the process, the MTC terminal may acquire the additional system information when the service demand or the demand for the cell handover exists, and does not need to maintain frequently monitoring of the additional system information after receiving the key system information, so as to prevent wasting system resources.

In an example of the present disclosure, the key system information received by the MTC terminal may carry a target period duration, where the target period duration is set by the base station for broadcasting the additional system information to the MTC terminal, and the target period duration may exceed a period duration in which the base station broadcasts SIB1 of the SIBs. Correspondingly, the MTC terminal may acquire the additional system information, when an accumulated duration between a current time point and a time point at which the key system information is received reaches the target period duration; or when the accumulated duration is less than the target period duration, but there is a service demand or a demand for cell handover. Through the process, the MTC terminal can determine the time point of acquiring the additional system information according to the target period duration sent by the base station and its own demands, so as to prevent wasting system resources and improve the efficiency of the 5G communication system.

In an example of the present disclosure, after broadcasting key system information, a base station may send additional system information to an MTC terminal based on an acquisition request for the additional system information sent by the MTC terminal when determining that a triggering condition for acquiring the additional system information is met. Through the process, the problem of wasting system resources caused by continuously sending the additional system information to the MTC terminal using high frequency beam sweeping method can be avoided, which is more suitable for the beam sweeping scenario in 5G.

In an example of the present disclosure, the base station may set a target period duration for broadcasting the additional system information to the MTC terminal, and the target period duration may be relatively long and may exceed a period duration in which the base station broadcasts SIB1 of the SIBs. The base station broadcasts the target period duration through the key system information. After receiving, the MTC terminal may determine a time point for acquiring the additional system information according to the target period duration sent by the base station and its own demands, so as to prevent wasting system resources and improve the efficiency of the 5G communication system.

The above general description and the following detailed description are intended to be illustrative and explanatory, and not to be limiting of the present disclosure.

BRIEF DESCRIPTION OF THE DRAWINGS

The accompanying drawings, incorporated in and constitute part of the specification, illustrate the examples of the present disclosure, and serve to explain the principles of the present disclosure in conjunction with the specification.

DETAILED DESCRIPTION

Examples will be described in detail herein, with illustrations thereof represented in the drawings. When drawings are involved in the description below, like numerals in different drawings refers to like or similar elements unless otherwise indicated. The embodiments described in the following examples do not represent all embodiments consistent with the present invention. Instead, they are merely examples of apparatuses and methods consistent with some aspects of the invention as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and encompasses any and all possible combinations of one or more of the associated listed items.

It is to be understood that although terms "first", "second", "third", etc. may be used in the present disclosure to describe various information, such information should not be limited to these terms. These terms are only used to distinguish the same type of information from each other. For example, the first information may also be referred to as second information without departing from the scope of the present disclosure. Similarly, the second information may also be referred to as first information. Depending on the context, the word "if" as used herein may be interpreted as "when" or "as" or "in response to a determination."

The technical solution provided by the present disclosure is applicable to a 5G network, or any other network communication systems that uses high frequency beams for information transmission. The high frequency beam refers to a beam with a frequency point of 6 GHz or higher. The execution body involved in the present disclosure includes: a transmitting end and a receiving end of the high frequency beam. The transmitting end of the high frequency beam may be a base station provided with a large-scale antenna array. The receiving end of the high frequency beam may be an MTC terminal, such as a smart electricity meter, an MTC monitor, a vending machine, or the like. In an implementation process, the transmitting end and the receiving end of the high frequency beam are independent from and in contact with each other to jointly implement the technical solution provided by the present disclosure.

Figure 1:
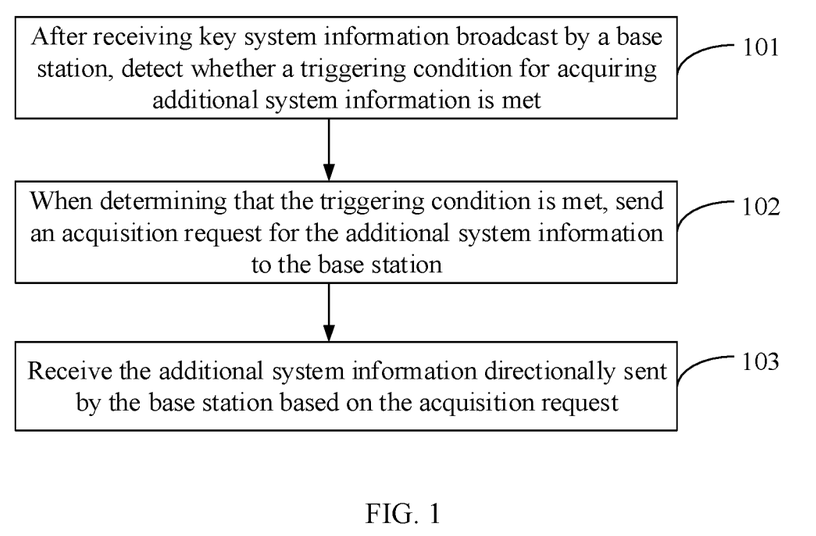
FIG. 1 is a flowchart illustrating a method of acquiring information according to an example.

The present disclosure provides an information acquisition method that can be used for an MTC terminal in a 5G system. FIG. 1 is a flowchart illustrating a method of acquiring information according to an example. The method can include the following steps.

At step 101, after receiving key system information broadcast by a base station, whether a triggering condition for acquiring additional system information is met is detected.

At step 102, when determining that the triggering condition is met, an acquisition request for the additional system information is sent to the base station.

At step 103, receiving the additional system information directionally sent by the base station based on the acquisition request.

In the example, after receiving the key system information, the MTC terminal requests to acquire the additional system information only when the triggering condition for acquiring the additional system information is met, which is more suitable for the beam sweeping scenario in 5G, and improves the efficiency of a 5G communication system.

For the above step 101, optionally, the key system information is minimum system information required for the terminal to randomly access the base station, and may include an MIB (Master Information Block). In other words, the key system information may allow terminals of all types to reside and initiate random access. The additional system information is system information other than the key system information, and may include an SIB (System Information Block).

In the related art, after receiving the key system information, if the MTC terminal needs to acquire the additional system information at a certain time, such as SIBn, the MTC terminal may send an acquisition request to the base station at that time and starts monitoring beams sent by the base station, waiting for acquiring SIBn.

In an example of the present disclosure, in order to save system resources, the MTC terminal automatically detects whether the triggering condition for acquiring the additional system information is met after receiving the key system information. Optionally, the triggering condition includes any one of the following conditions:

a service demand is detected; and a demand for a cell handover is detected.

The service demand of the MTC terminal may be a service triggering initiated by the MTC terminal itself or a paging triggering initiated by other terminals for the MTC terminal. For example, when the MTC terminal detects that its own service button is triggered, it determines that a service triggering exists. When the MTC terminal receives a paging request for itself from the network side, for example, forwarded from the base station, it determines that a paging triggering exists.

In addition, although the MTC terminal is of low mobility, once a location change or the like occurs, a cell handover may be performed. In an example of the present disclosure, when the MTC terminal detects that it is to perform the cell handover, it also determines that the triggering condition for acquiring the additional system information is currently met. Optionally, the MTC terminal may determine that the cell handover is to be performed when detecting that a strength of a received reference signal for the current cell is lower than a preset threshold.

At this step, after receiving the key system information sent by the base station according to the high-frequency beam sweeping manner, the MTC terminal may determine that the triggering condition for acquiring the additional system information is met when detecting the service triggering, the paging triggering, or that the strength of the reference signal of the current cell is lower than the preset threshold.

For the above step 102, the MTC terminal sends the acquisition request for the additional system information to the base station according to related art when determining that the triggering condition is met.

For the above step 103, the base station sends the additional system information to the MTC terminal based on the acquisition request, and the MTC terminal directly receives.

In the related art, uplink and downlink signals of a system are transmitted on different time slots with the same frequency resource, so within a relatively short time, channel fading associated with uplink and downlink transmission signals is considered the same. This is channel reciprocity. Based on the channel reciprocity, the base station may obtain information of the channel fading to be experienced by downlink transmission signals through uplink reception information, and a beamforming (smart antenna) function of the base station is well supported. In a downlink signal transmission process, the beamforming technology adjusts weighting coefficients of each unit in an antenna array by using uplink channel information acquired by the base station, so as to generate a directional beam, thereby obtaining an obvious array gain. The beamforming technology has great advantages in expanding coverage, improving edge throughput, suppressing and coordinating interference and other aspects.

In an example of the present disclosure, in a process in which the MTC terminal sends the acquisition request to the base station, the base station may, based on the channel reciprocity, directionally send the additional system information to the MTC terminal.

In the above example, the MTC terminal may acquire the additional system information when there is the service demand or the demand for the cell handover, and does not need to maintain frequently monitoring of the additional system information after receiving the key system information, so as to avoid wasting system resources.

In an example, the base station may set a relatively long target period duration for broadcasting the additional system information to the MTC terminal, and the target period duration may be sent to the MTC terminal through the key system information. Optionally, the target period duration exceeds a period duration in which the base station broadcasts SIB1 of the SIBs.

In the related art, after receiving the key system information, for example the MIB, the MTC terminal starts monitoring the SIB1. The SIB1 includes NAS (Network Attached Storage) system information, terminal timers and constant information in an idle mode, and terminal timers and constant information in a connected mode. The period duration of the SIB1 is 80 milliseconds.

In an example of the present disclosure, the target period duration configured by the base station for the MTC terminal may exceed the period duration of the SIB1. The target period duration may be several times a period duration of the key system information. If the period duration of the MIB is 40 milliseconds, and the target period duration is 8 times the period duration of the MIB, then the target period duration is 320 milliseconds.

Correspondingly, the triggering condition can include any one of the following conditions:

an accumulated duration between a current time point and a time point at which the key system information is received reaches the target period duration;

when the accumulated duration is less than the target period duration, a service demand is detected; and when the accumulated duration is less than the target period duration, a demand for a cell handover is detected.

In other words, after receiving the key system information, the MTC terminal may determine a time point to initiate the acquisition request according to the target period duration carried in the key system information and its own demands.

When the accumulated duration between the current time point and the time point at which the key system information is received is less than the target period duration, while the MTC terminal has the service demand as a service triggering or a paging triggering, or requires a cell handover, it is determined that the triggering condition is met. When it is determined that the trigger condition is met, the MTC terminal sends the acquisition request to the base station to acquire the additional system information. When the accumulated duration reaches the target period duration, even if the MTC terminal does not have the service demand or require the cell handover, the MTC terminal is to send the acquisition request to the base station for acquiring the additional system information, so as to prevent the system from losing monitoring of the MTC terminal due to a long-time non-interaction between the MTC terminal and the system.

In the above example, the MTC terminal can determine the time point of acquiring the additional system information according to the target period duration sent by the base station and its own demands, so as to prevent wasting system resources and improve the efficiency of the 5G communication system.

Figure 2:
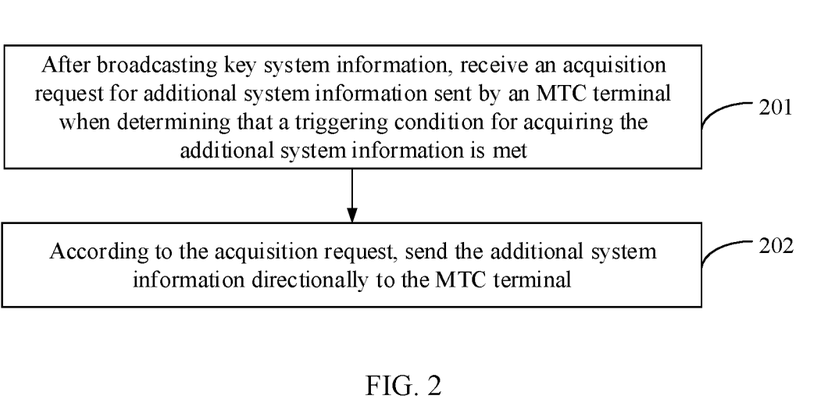
FIG. 2 is a flowchart illustrating another method of acquiring information according to an example.

Another information acquisition method that can be used for a base station in a 5G system is also provided by the present disclosure. FIG. 2 is a flowchart illustrating a method of acquiring information according to an example. The method can include the following steps.

At step 201, after broadcasting key system information, an acquisition request for additional system information is received, where the acquisition request is sent by an MTC terminal when the MTC terminal determines that a triggering condition for acquiring the additional system information is met.

At step 202, according to the acquisition request, the additional system information is directionally sent to the MTC terminal.

In the example, after broadcasting the key system information, the base station may directionally send the additional system information to the MTC terminal based on the acquisition request for the additional system information, where the acquisition request is sent by the MTC terminal when it determines that the triggering condition for acquiring the additional system information is met. Through the process, a problem of wasting system resources caused by continuously sending the additional system information to the MTC terminal with a high frequency beam sweeping method can be avoided, which is more suitable for a beam sweeping scenario in 5G.

For the above step 201, after sending the key system information in a beam sweeping manner, the base station may receive, according to the related art, the acquisition request for the additional system information, which is sent by the MTC terminal when it is determined that the triggering condition for acquiring the additional system information is met. The key system information is minimum system information required for a terminal to randomly access the base station, and may include a MIB. In other words, the key system information may allow terminals of all types to reside and initiate random access. The additional system information is system information other than the key system information, and may include an SIB.

When the MTC terminal detects that it has a service demand or it needs to perform a cell handover, it determines that the triggering condition is met. At this time, the MTC terminal sends the acquisition request to the base station, and the base station can receive the acquisition request according to the related art.

For the above step 202, uplink and downlink signals of a system are transmitted on different time slots with the same frequency resource, so within a relatively short time, channel fading associated with uplink and downlink transmission signals is considered the same. This is channel reciprocity. Based on the channel reciprocity, the base station may obtain information of the channel fading to be experienced by downlink transmission signals through uplink reception information, and a beamforming (smart antenna) function of the base station is well supported. In a downlink signal transmission process, the beamforming technology adjusts weighting coefficients of each unit in an antenna array by using uplink channel information acquired by the base station, so as to generate a directional beam, thereby obtaining an obvious array gain. The beamforming technology has great advantages in expanding coverage, improving edge throughput, suppressing and coordinating interference and other aspects.

In an example of the present disclosure, in a process in which the MTC terminal sends the acquisition request to the base station, the base station may, based on the received acquisition request, directionally send the additional system information to the MTC terminal according to the channel reciprocity.

Figure 3:
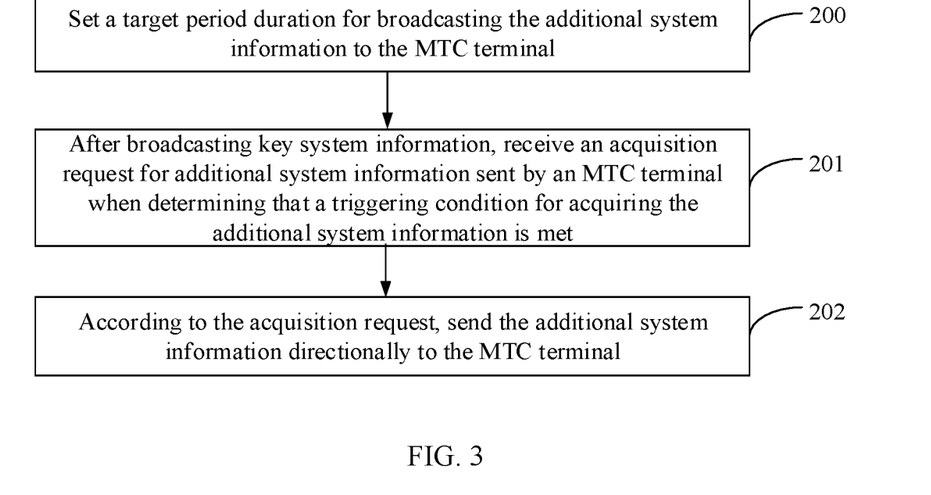
FIG. 3 is a flowchart illustrating another method of acquiring information according to an example.

FIG. 3 is a flowchart illustrating another method of acquiring information according to an example. In the example, the method for acquiring information can further include:

at step 200, a target period duration for broadcasting the additional system information to the MTC terminal is set, where the target period duration exceeds a period duration in which the base station broadcasts SIB1 of the SIBs.

At this step, the base station may configure a target period duration for broadcasting the additional system information to the MTC terminal, with regard to the low mobility and time tolerability of the MTC terminal. In order to save system resources, the target period can be relatively long. Optionally, the target period duration may exceed the period duration in which the base station broadcasts the SIB1 of the SIBs. For example, the target period duration may be 320 milliseconds or even 1024 milliseconds.

Further, the key system information that the base station broadcasts carries the target period duration.

After receiving the key system information, the MTC terminal may determine a time point to send the acquisition request based on the target period duration and its own demands. In other words, when an accumulated duration between a current time point and a time point at which the key system information is received reaches the target period duration, the MTC terminal will send the acquisition request to the base station for acquiring the additional system information, no matter whether the MTC terminal has a service demand or requires a cell handover. Otherwise, when the accumulated duration is less than the target period duration, if a demand for the cell handover is detected or the service demand is detected, the acquisition request is sent to the base station.

In the example, the base station may set the target period duration for broadcasting the additional system information to the MTC terminal, and the target period duration may be relatively long and may exceed the period duration in which the base station broadcasts the SIB1 of the SIBs. The base station broadcasts the target period duration through the key system information. After receiving, the MTC terminal may determine the time point for acquiring the additional system information according to the target period duration sent by the base station and its own demands, so as to prevent wasting system resources and improve the efficiency of the 5G communication system.

In an example of the present disclosure, a terminal of other type, for example, a mobile terminal interacting with the base station, the mobile terminal cannot acquire the additional system information only when the triggering condition is met, because the mobile terminal has strict requirements for latency. Therefore, after receiving the key system information broadcast by the base station, the mobile terminal may actively send an acquisition request for the additional system information, so as to acquire the additional system information. It is not necessary to acquire the additional system information only when an accumulated duration reaches a target period duration, or when the accumulated duration is less than the target period duration, but there is a service demand or a demand for a cell handover.

Figure 4:
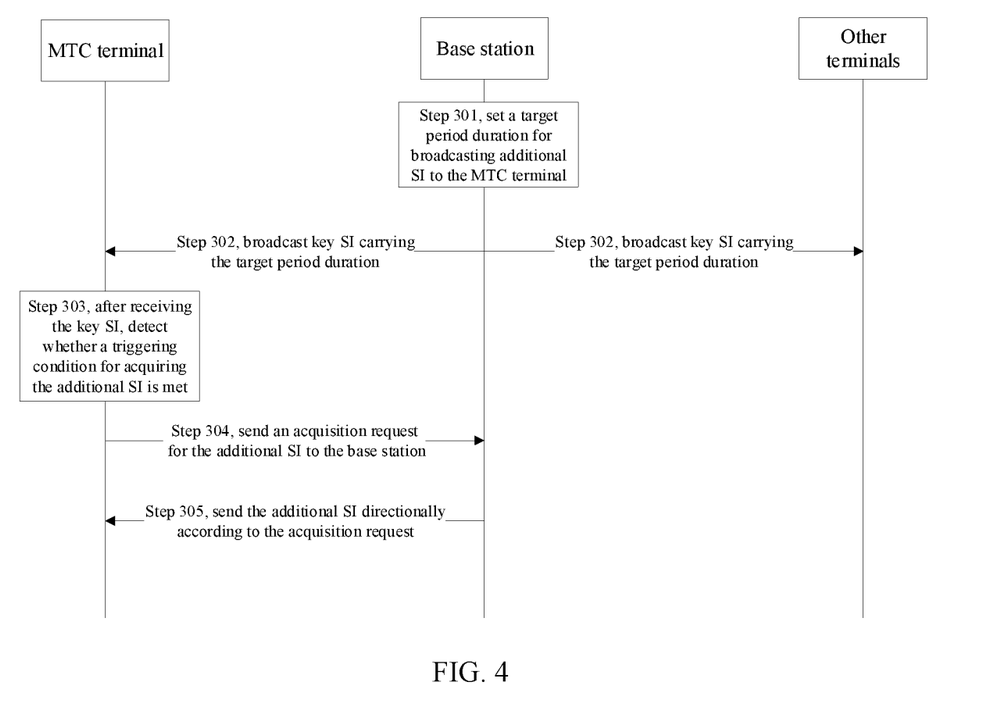
FIG. 4 is a flowchart illustrating another method of acquiring information according to an example.

Another method for acquiring information is also provided by the present disclosure. FIG. 4 is a flowchart illustrating a method of acquiring information according to an example. The method can include the following steps.

At step 301, a base station sets a target period duration for broadcasting additional system information to an MTC terminal.

Optionally, the target period duration may be relatively long, for example, it may exceed a period duration in which the base station broadcasts SIB1 of the SIBs.

At step 302, the base station broadcasts key system information carrying the target period duration.

At step 303, after receiving the key system information, the MTC terminal detects whether a triggering condition for acquiring additional system information is met.

Optionally, when an accumulated duration between a current time point and a time point at which the key system information is received is less than the target period duration, the MTC terminal will monitor if it has a service demand or requires a cell handover.

When the accumulated duration reaches the target period duration, it is determined that the triggering condition is met. When the accumulated duration is less than the target period duration while the MTC terminal detects that there is a service demand, it is determined that the triggering condition is met. When the accumulated duration is less than the target period duration while the MTC terminal detects that there is a demand for a cell handover, it is determined that the triggering condition is met. At this point, proceed to step 304.

At step 304, the MTC terminal sends an acquisition request for the additional system information to the base station.

At step 305, the base station sends the additional system information directionally to the MTC terminal according to the acquisition request.

Terminals of other types, for example mobile terminals, have stricter requirements for latency. Therefore, after receiving the key system information broadcast by the base station, the mobile terminal may immediately send an acquisition request for the additional system information to the base station, so as to acquire the additional system information.

In the example, with regard to the low mobility and time tolerability of the MTC terminal, the base station configures a relatively long target period duration for broadcasting the additional system information to the MTC terminal. After receiving the key system information broadcast by the base station, when the accumulated duration is less than the target period duration, the MTC terminal may initiate the acquisition request for the additional system information to the base station at any time according to a service demand or a demand for a cell handover, so as to acquire the additional system information. Otherwise, when the accumulated duration reaches the target period duration, the MTC terminal directly initiates the acquisition request to the base station and acquires the additional system information. Through the process, after receiving the key system information, the MTC terminal can determine the time point to acquire the additional system information according to its own demands or the target period duration. In this way, there is no need to maintain frequently monitoring of the additional system information, a waste of system resources is avoided, and the efficiency of the 5G communication system is improved.

For the simplicity of description, all the foregoing method examples are expresses as a combination of a series of actions. However, those skilled in the art are to be aware of that the present disclosure is not limited by the sequence of the described actions, because according to the present disclosure, some steps may be performed in alternative sequences or at the same time.

Secondly, those skilled in the art are also to be aware of that the examples described in the specification are all optional examples, and the actions and modules involved are not necessarily required by the present disclosure.

Corresponding to the foregoing examples of methods implemented by applying functions, the present disclosure also provides apparatus examples implemented by applying functions and an example of a corresponding terminal.

Figure 5:
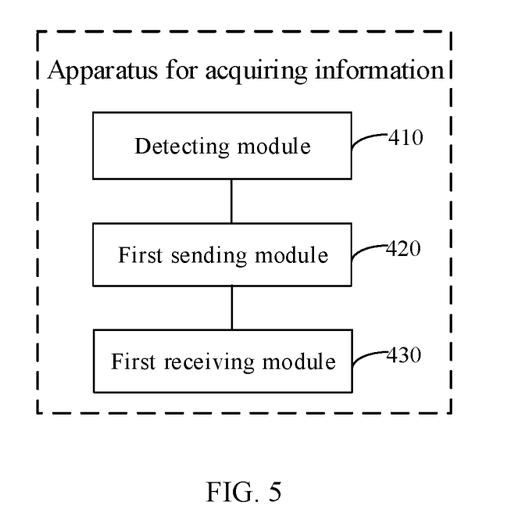
FIG. 5 is a block diagram illustrating an apparatus for acquiring information according to an example.

FIG. 5 is a block diagram illustrating an apparatus for acquiring information according to an example. Applied to an MTC terminal, the apparatus can include:

a detecting module 410, configured to detect, after receiving key system information broadcast by the base station, whether a triggering condition for acquiring additional system information is met;

a first sending module 420, configured to send, after determining that the triggering condition is met, an acquisition request for the additional system information to the base station; and a first receiving module 430, configured to receive the additional system information directionally sent by the base station based on the acquisition request;

where the key system information is minimum system information required for the terminal to randomly access the base station, and the additional system information is system information other than the key system information.

Optionally, the triggering condition includes any one of the following conditions:

a service demand is detected; and a demand for a cell handover is detected.

Optionally, the key system information carries a target period duration set by the base station for broadcasting the additional system information to the MTC terminal, where the target period duration exceeds a period duration in which the base station broadcasts SIB1 of the SIBs.

Optionally, the triggering condition includes any one of the following conditions:

an accumulated duration between a current time point and a time point at which the key system information is received reaches the target period duration;

when the accumulated duration is less than the target period duration, the service demand is detected; and when the accumulated duration is less than the target period duration, the demand for the cell handover is detected.

Figure 6:
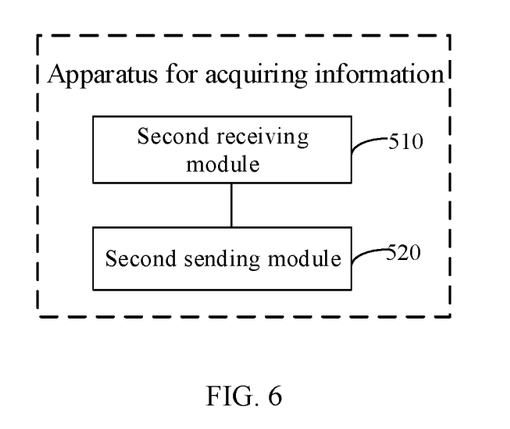
FIG. 6 is a block diagram illustrating another apparatus for acquiring information according to an example.

FIG. 6 is a block diagram illustrating another apparatus for acquiring information according to an example. Applied to a base station, the apparatus includes:

a second receiving module 510, configured to receive, after broadcasting key system information, an acquisition request for additional system information sent by an MTC terminal when determining that a triggering condition for acquiring the additional system information is met; and a second sending module 520, configured to send the additional system information directionally to the MTC terminal according to the acquisition request;

where the key system information is minimum system information required for the terminal to randomly access the base station, and the additional system information is system information other than the key system information.

Figure 7:
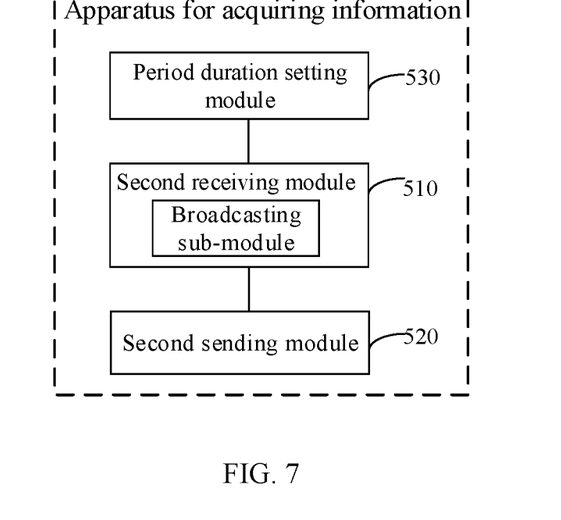
FIG. 7 is a block diagram illustrating another apparatus for acquiring information according to an example.

FIG. 7 is a block diagram illustrating another apparatus for acquiring information according to an example. The apparatus further includes:

a period duration setting module 530, configured to a target period duration for broadcasting the additional system information to the MTC terminal, where the target period duration exceeds a period duration in which the base station broadcasts SIB1 of the SIBs;

the second receiving module 510 includes a broadcasting sub-module 511, configured to broadcast the key system information carrying the target period duration.

Since the apparatus examples basically correspond to the method examples, reference may be made partially to the description of the method examples for relevant details. The apparatus examples described above are merely illustrative, where the units described as separate components may or may not be physically separated, and the components displayed as units may or may not be physical units, e.g., they may be located in one place or distributed to multiple nodes in a network. Some or all of the modules may be selected according to actual needs to achieve the objectives of the present disclosure. Those of ordinary skill in the art can understand and implement the examples without any creative effort.

Correspondingly, examples of the present disclosure provide a computer readable storage medium, where the storage medium stores a computer program for performing any one of the methods of acquiring information applied to an MTC terminal.

Correspondingly, examples of the present disclosure provide a computer readable storage medium, where the storage medium stores a computer program for performing any one of the methods of acquiring information applied to a base station.

Correspondingly, the examples of the present disclosure provide an MTC terminal, including:

a processor; and a memory for storing processor executable instructions;

where the processor is configured to:

after receiving key system information broadcast by a base station, detect whether a triggering condition for acquiring additional system information is met;

when determining that the triggering condition is met, send an acquisition request for the additional system information to the base station; and receive the additional system information directionally sent by the base station based on the acquisition request;

where the key system information is minimum system information required for the terminal to randomly access the base station, and the additional system information is system information other than the key system information.

Figure 8:
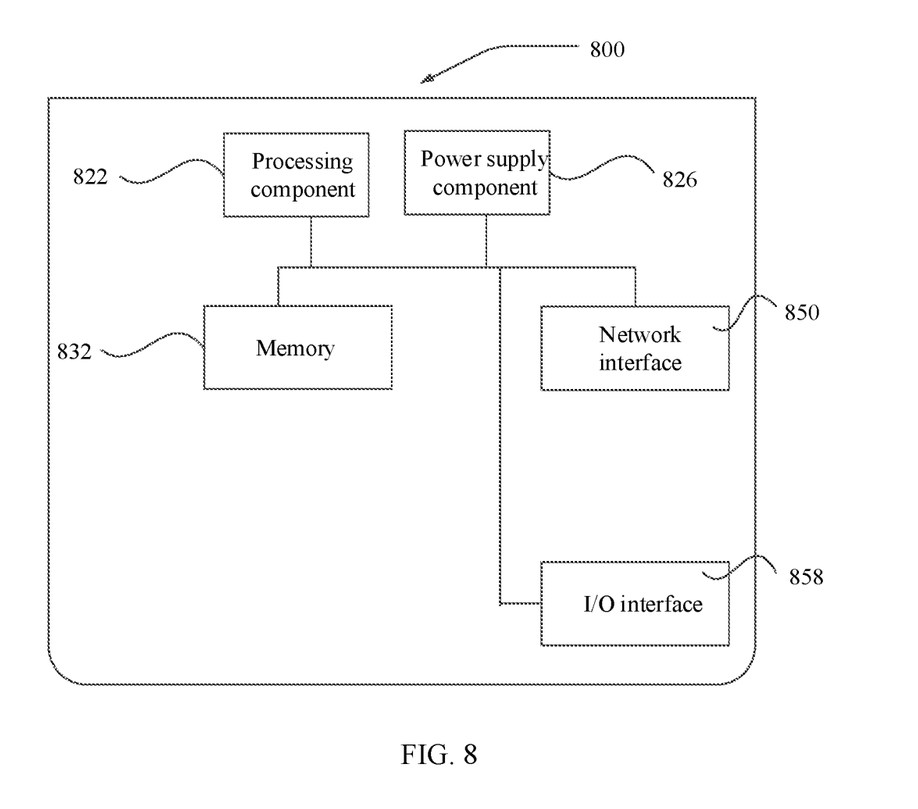
FIG. 8 is a schematic diagram illustrating a structure of an MTC terminal according to an example of the present disclosure.

FIG. 8 is a block diagram illustrating a structure applied to an apparatus 800 for acquiring information according to an example. For example, the apparatus 800 may be an MTC terminal, and may be specifically a smart electricity meter or the like.

Referring to FIG. 8, the apparatus 800 includes a processing component 822 that further includes one or more processors, and memory resources represented by memory 832 for storing instructions (e.g. applications) executable by the processing component 822. The application stored in memory 832 may include one or more modules, each corresponding to a set of instructions. Further, the processing component 822 is configured to execute instructions to perform the methods of acquiring information described above.

The apparatus 800 may also include a power supply component 826 configured to perform power management for the apparatus 800, a wired or wireless network interface 850 configured to connect the apparatus 800 to a network, and an input/output (I/O) interface 858. The apparatus 800 can handle an operating system stored in memory 832, such as Android, iOS, Windows Server™, Mac OS X™, Unix™, Linux™, FreeBSD™ or the like.

When the instructions stored in the memory 832 are executed by the processing component 822, the apparatus 800 is enabled to perform a method of acquiring information, including:

after receiving key system information broadcast by a base station, detecting whether a triggering condition for acquiring additional system information is met;

when determining that the triggering condition is met, sending an acquisition request for the additional system information to the base station; and receiving the additional system information directionally sent by the base station based on the acquisition request;

where the key system information is minimum system information required for the terminal to randomly access the base station, and the additional system information is system information other than the key system information.

Correspondingly, the present disclosure also provides a base station, including:

a processor; and a memory for storing processor executable instructions;

where the processor is configured to:

after broadcasting key system information, receive an acquisition request for additional system information sent by an MTC terminal when determining that a triggering condition for acquiring the additional system information is met; and according to the acquisition request, send the additional system information directionally to the MTC terminal;

where the key system information is minimum system information required for the terminal to randomly access the base station, and the additional system information is system information other than the key system information.

Figure 9:
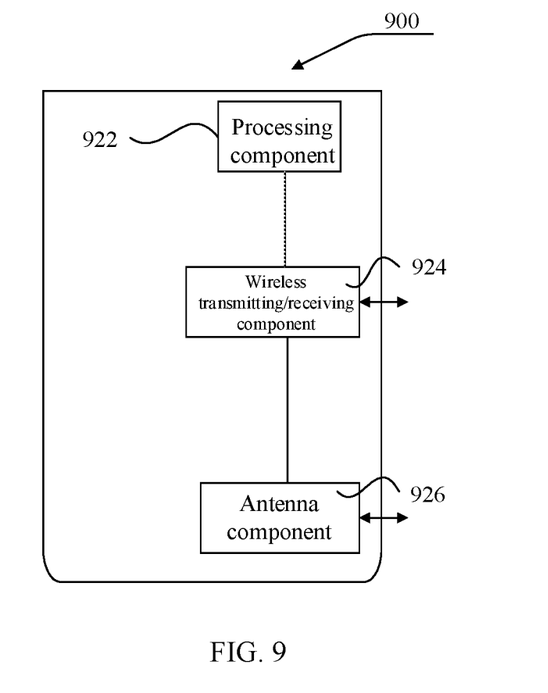
FIG. 9 is a schematic diagram illustrating a structure of a base station according to an example of the present disclosure.

FIG. 9 is a block diagram illustrating a structure applied to an apparatus 900 for acquiring information according to an example. Apparatus 900 can be provided as a base station. As shown in FIG. 9, the apparatus 900 includes a processing component 922, a wireless transmitting/receiving component 924, an antenna component 926, and a signal processing portion specific to a radio interface. The processing component 922 further includes one or more processors.

One of the processors of the processing component 922 is configured to:

after broadcasting key system information, receive an acquisition request for additional system information sent by an MTC terminal when determining that a triggering condition for acquiring the additional system information is met; and according to the acquisition request, send the additional system information directionally to the MTC terminal;

where the key system information is minimum system information required for the terminal to randomly access the base station, and the additional system information is system information other than the key system information.

Other embodiments of the present disclosure will be apparent to those skilled in the art after considering the specification and implementing the solutions disclosed herein. The present application is intended to encompass any variations, uses, or adaptations of the present disclosure, which variations, uses, or adaptations are in accordance with the general principles of the present disclosure and comprise common general knowledge or common technical means in the art which are not disclosed in the present disclosure. The specification and examples are to be regarded as illustrative only, the true scope and spirit of the present disclosure are expressed by the following claims.

It is to be understood that the present disclosure is not limited to the accurate structures already described above and expressed in the accompanying drawings, and is subject to modifications and variations without exceeding its scope. The scope of the present disclosure is to be limited only by the appended claims.

The invention claimed is:

1. A method of acquiring information, the method being applied to a machine type communication (MTC) terminal, and comprising: after receiving key system information broadcast by a base station, detecting whether a triggering condition for acquiring additional system information is met, wherein the key system information carries a target period duration set by the base station for broadcasting the additional system information to the MTC terminal, and the target period duration exceeds a period duration in which the base station broadcasts SIB1 of the system information blocks (SIBs); upon determining that the triggering condition is met, sending an acquisition request for the additional system information to the base station; and receiving the additional system information directionally sent by the base station based on the acquisition request; wherein the key system information is minimum system information required for the terminal to randomly access the base station, and the additional system information is system information other than the key system information; and wherein the triggering condition comprises any one of: an accumulated duration between a current time point and a time point at which the key system information is received reaches the target period duration; when the accumulated duration is less than the target period duration, the service demand is detected; and when the accumulated duration is less than the target period duration, the demand for the cell handover is detected.

2. A communication system implementing the method according to claim 1, wherein the communication system is a 5G communication system with beam sweeping.

3. The communication system according to claim 2, wherein the MCT terminal is configured to acquire, after the receiving the key system information, the additional system information only when the triggering condition for acquiring the additional system information is met.

4. The communication system according to claim 3, wherein the MTC terminal is configured to determine that the triggering condition for acquiring the additional system information is met by detecting that a service demand exists in itself, and/or when detecting a demand for a cell handover.

5. The communication system according to claim 4, wherein the MTC terminal is configured to send the acquisition request to the base station, so as to acquire the additional system information returned by the base station based on the acquisition request upon determining that the triggering condition for acquiring the additional system information is met.

6. The communication system according to claim 5, wherein the MTC terminal is configured to acquire the additional system information when the service demand or the demand for the cell handover exists, without maintaining frequently monitoring of the additional system information after receiving the key system information, thereby reducing system resource usage.

7. The communication system according to claim 6, wherein the MTC terminal is configured to acquire the additional system information, when an accumulated duration between a current time point and a time point at which the key system information is received reaches the target period duration; or when the accumulated duration is less than the target period duration, but there is a service demand or a demand for cell handover.

8. The communication system according to claim 7, further comprising the base station, wherein the MTC terminal is configured to determine the time point of acquiring the additional system information according to the target period duration sent by the base station, and demands by the MTC terminal; the base station is configured to, after broadcasting key system information, send additional system information to the MTC terminal based on an acquisition request for the additional system information sent by the MTC terminal when determining that the triggering condition for acquiring the additional system information is met, thereby avoiding continuously sending the additional system information to the MTC terminal using high frequency beam sweeping; and the base station is configured to set a target period duration for broadcasting the additional system information to the MTC terminal, and the target period duration exceeds a period duration in which the base station broadcasts SIB1 of the SIBs; the base station is configured to broadcast the target period duration through the key system information; and the MTC terminal is configured to, after receiving the target period duration, determine a time point for acquiring the additional system information according to the target period duration sent by the base station, and the demands by the MTC terminal.

9. A method of acquiring information, the method being applied to a base station, and comprising: setting a target period duration for broadcasting additional system information to a machine type communication (MTC) terminal, wherein the target period duration exceeds a period duration in which the base station broadcasts SIB1 of the SIBs; after broadcasting key system information carrying the target period duration, receiving an acquisition request for the additional system information sent by the MTC terminal when determining that a triggering condition for acquiring the additional system information is met; and according to the acquisition request, sending the additional system information directionally to the MTC terminal; wherein the key system information is minimum system information required for the terminal to randomly access the base station, and the additional system information is system information other than the key system information; and wherein the triggering condition comprises any one of: an accumulated duration between a current time point and a time point at which the key system information is received reaches the target period duration; when the accumulated duration is less than the target period duration, the service demand is detected; and when the accumulated duration is less than the target period duration, the demand for the cell handover is detected.

10. A machine type communication (MTC) terminal, comprising: a processor; and a memory for storing processor executable instructions; wherein the processor is configured to: after receiving key system information broadcast by a base station, detect whether a triggering condition for acquiring additional system information is met, wherein the key system information carries a target period duration set by the base station for broadcasting the additional system information to the MTC terminal, and the target period duration exceeds a period duration in which the base station broadcasts SIB1 of the system information blocks (SIBs); when determining that the triggering condition is met, send an acquisition request for the additional system information to the base station; and receive the additional system information directionally sent by the base station based on the acquisition request; wherein the key system information is minimum system information required for the terminal to randomly access the base station, and the additional system information is system information other than the key system information; and wherein the triggering condition comprises any one of: an accumulated duration between a current time point and a time point at which the key system information is received reaches the target period duration; when the accumulated duration is less than the target period duration, the service demand is detected; and when the accumulated duration is less than the target period duration, the demand for the cell handover is detected.

11. A base station, comprising: a processor; a memory for storing processor executable instructions; wherein the processor is configured to: setting a target period duration for broadcasting additional system information to a machine type communication (MTC) terminal, wherein the target period duration exceeds a period duration in which the base station broadcasts SIB1 of the SIBs; after broadcasting key system information carrying the target period duration, receive an acquisition request for the additional system information sent by the MTC terminal when determining that a triggering condition for acquiring the additional system information is met; and according to the acquisition request, send the additional system information directionally to the MTC terminal; wherein the key system information is minimum system information required for the terminal to randomly access the base station, and the additional system information is system information other than the key system information; and wherein the triggering condition comprises any one of: an accumulated duration between a current time point and a time point at which the key system information is received reaches the target period duration; when the accumulated duration is less than the target period duration, the service demand is detected; and when the accumulated duration is less than the target period duration, the demand for the cell handover is detected.

\* \* \* \* \*